(No Model.)
A. G. MACK.
FISH HOOK.
No. 454,580. Patented June 23, 1891.
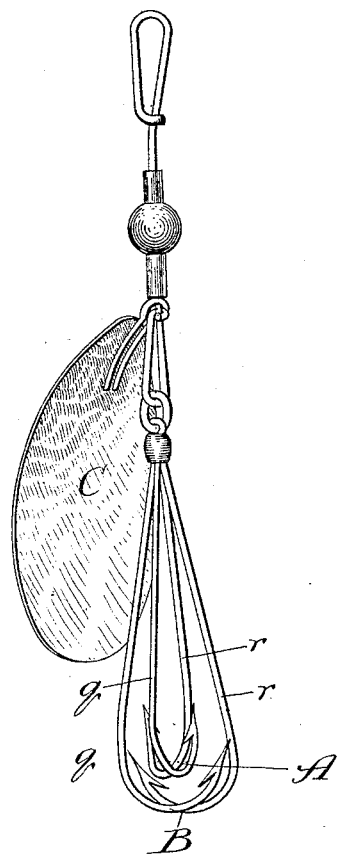
Witnesses:
Chas. E. Gaylord.
J. H. Dyrenforth.
Inventor:
Albert G. Mack.
By Dyrenforth & Dyrenforth
Attys.

UNITED STATES PATENT OFFICE.

ALBERT G. MACK, OF ROCHESTER, NEW YORK, ASSIGNOR OF ONE-HALF TO CHARLES E. FELTON, OF CHICAGO, ILLINOIS.

FISH-HOOK.

SPECIFICATION forming part of Letters Patent No. 454,580, dated June 23, 1891.

Application filed February 18, 1891. Serial No. 381,832. (No model.)

*To all whom it may concern:*

Be it known that I, ALBERT G. MACK, a citizen of the United States, residing at Rochester, in the county of Monroe and State of New York, have invented a new and useful Improvement in Fish-Hooks, of which the following is a specification.

My invention relates particularly to an improvement in trolling-hooks; and the primary object of my improvement is to provide a construction for such hooks whereby the points thereof shall be effectually protected without interfering in any manner with their function while trolling or fishing among weeds.

To this end my improvement essentially involves a cluster or group of two, or of any desired multiple of two hooks, arranged, accordingly, in one or more pairs, the members of each pair being rigidly fastened together near the upper ends of their shanks to cause their curved hook ends to coincide inversely and be maintained normally in their mutually-shielding positions and tend to resume the same when separated by the elasticity of the hooks.

My improvement is illustrated in the accompanying drawing by a perspective view representing the cluster as composed of two pairs of hooks arranged in accordance with my invention to extend at right angles to each other.

A denotes one pair of hooks, and B another pair thereof. The pair A is composed of the members $r$ and $q$, joined together near the upper ends of their shank portions at points to cause their curved portions with the barbs thereon to coincide, the last-named portions being caused to face in opposite directions, whereby the barb on one will bear against one side of the other near the junction of the shank thereof with its curved portion, and the barb of the other will similarly bear against the opposite side of the first. Thus, as will be seen, the barbs are shielded one by the other against entanglement with weeds, though the relative disposition thereof need not be accurately as shown and described, provided the curved barbed portions of the hooks extend oppositely and so coincide with each other as to afford the desired mutual protection, and provided, furthermore, that the hooks be rigidly united at their shank portions to adapt them to maintain by their elasticity their normal relative mutually-protecting positions and to resume the same automatically when separated therefrom.

I prefer to provide, as shown, at least two pairs A and B of hooks, all joined together in the manner described of one pair, with the members $r$ and $q$ of each pair normally coinciding, as and for the purpose stated, and with the pairs arranged to extend at angles, preferably right angles, to each other. Since thereby, however, the fish takes hold of the cluster the barbs of a pair of the hooks will be protruded outward by the pressure, and thus effect hooking, while with only a single pair, if grasped in a manner otherwise than to compress the hooks in opposite directions, the hooking of the fish may not be effected.

My improved device is represented in the drawing as provided with a spoon C, which may be applied by the usual or any suitable means, as indicated, to the hook-cluster, though I do not limit my improvement to use with a spoon or with any particular spoon.

What I claim as new, and desire to secure by Letters Patent, is—

1. A fish-hook device having a pair of hooks rigidly united at their shank portions to extend in opposite directions and normally overlap and mutually shield each other at their curved hook portions, the fastening securing the hooks to maintain yieldingly the said normal relative positions of their hook portions and tend by their elasticity to return thereto when separated, substantially as described.

2. A fish-hook device comprising hooks rigidly united in pairs at their shank portions to extend in opposite directions and normally overlap and mutually shield each other at their curved hook portions, the fastening adapting the hooks to maintain yieldingly the said normal relative positions of their hook portions and tend by their elasticity to return thereto when separated, and the said pairs being disposed at suitable angles one within another, substantially as described.

ALBERT G. MACK.

In presence of—
LESTER G. FISHER,
ROBT. ATTRIDGE.